United States Patent [19]
Locke, Sr.

[11] 4,371,235
[45] Feb. 1, 1983

[54] IMAGE CONTROL MIRROR

[76] Inventor: Travis E. Locke, Sr., 4522 U.S. 36 W., Greenville, Ohio 45331

[21] Appl. No.: 125,697

[22] Filed: Feb. 28, 1980

Related U.S. Application Data

[63] Continuation-in-part of Ser. No. 67,955, Aug. 20, 1979, abandoned.

[51] Int. Cl.³ .............................................. B60R 1/06
[52] U.S. Cl. ................................... 350/280; 350/281; 350/590
[58] Field of Search ............... 350/279, 276, 280, 202, 350/303, 304, 307, 289, 299, 281, 283; 74/67, 501 M; D12/187; 248/425, 466

[56] References Cited

U.S. PATENT DOCUMENTS 3,836,235  9/1974  Russel .................................. 350/280

Primary Examiner—John K. Corbin
Assistant Examiner—Rebecca D. Gass
Attorney, Agent, or Firm—Becker & Becker, Inc.

[57] ABSTRACT

An image control mirror, especially for trucks, commercial vehicles and the like, includes a housing, a transparent lens and a mirror-image providing surface on a member arranged within the housing. The surface can be located so as to extend to an angle in a range of about 2.25 or 2.3 to 3.9 times the distance in inches of transverse viewing width to the lens for safety to prevent glare and second and third images. Preferably, the angle is 3.4° per inch of width of the mirror or 20.5° in a six inch wide mirror that is sixteen inches high.

3 Claims, 5 Drawing Figures

U.S. Patent   Feb. 1, 1983   4,371,235
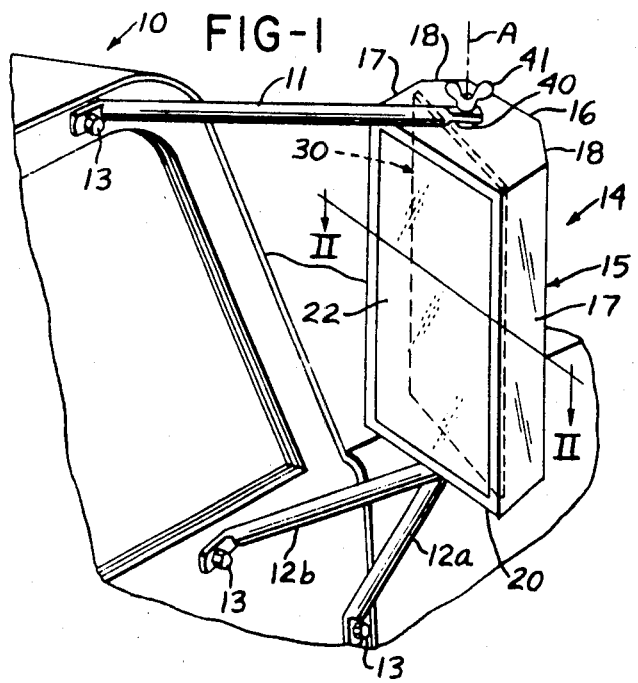
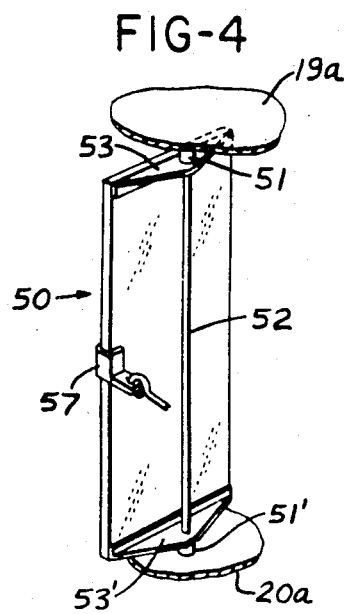
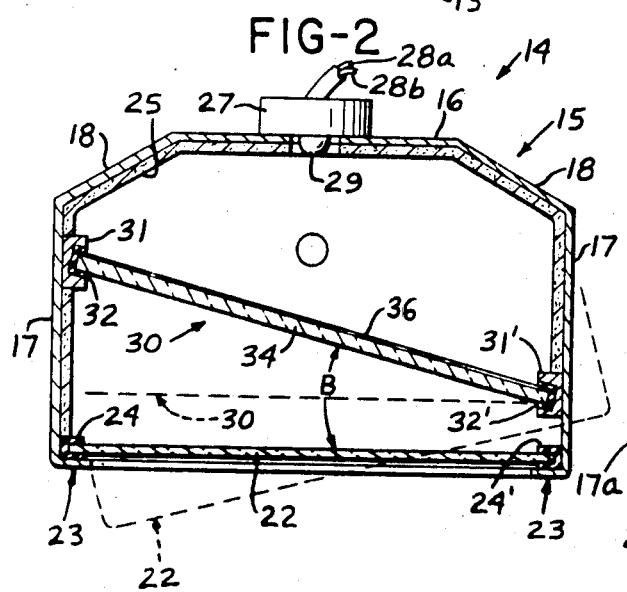
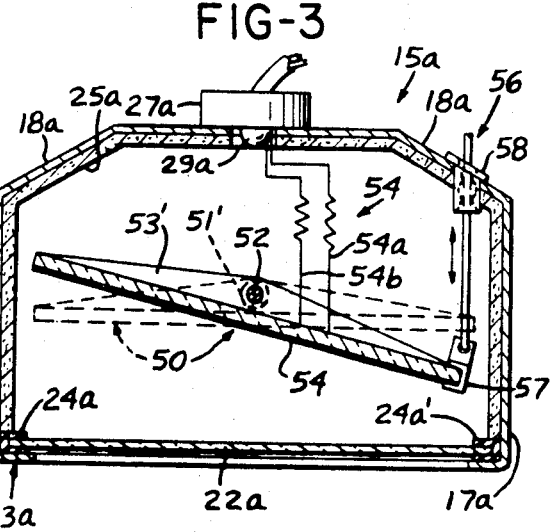
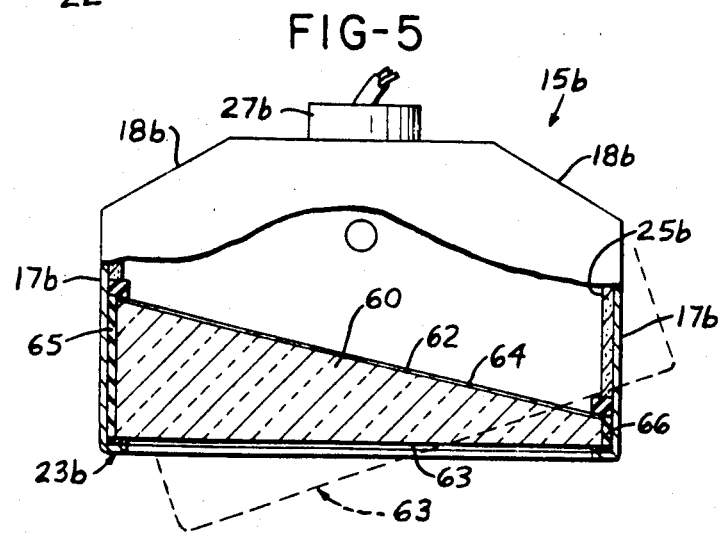

IMAGE CONTROL MIRROR

This is a continuation-in-part of co-pending application Ser. No. 67,955-Locke filed Aug. 20, 1979, now abandoned.

The present invention relates to image control mirrors, especially to heavy duty, side mirrors as are required by law for trucks or similar commercial vehicles.

For the observation of traffic situations to the rear of a vehicle, such as a truck, tandem trailer, and the like vehicle, there is required, by law, at least one mirror at the driver door, and, usually, a second mirror on the passenger side of the pertaining vehicle. Such a mirror or mirrors are positioned so that the driver can observe the rearward traffic situation from his seat; i.e. either by referring to the mirror located exteriorly of the cabin on his side or, when a mirror is installed on the other side of the cabin, by referring to the corresponding mirror on the right hand side of the vehicle.

Such mirrors for trucks usually have a larger surface area than the corresponding interior mirrors for passenger cars, and they are normally provided with an effective reflecting surface of about sixteen inches of vertical height and of about six inches of transverse width.

A remotely controlled day-night outside type mirror has recently been described in U.S. Pat. No. 3,924,938 of J. W. Carson issued Dec. 9, 1978. According to the proposal of Carson, the mirror is mounted in a frame assembly so as to be tiltable about a horizontal axis from a first position, corresponding to daytime usage of the mirror, to a second, tilted position, corresponding to nighttime usage, or a particular daytime usage of the mirror, e.g. in the event of bright sun light. Tilting of the mirror according to Carson is carried out by means of a control cable which can be manipulated by the driver of the truck so as to select the desired position of the mirror from within the truck cabin or cab.

There still exists, however, a need to provide a particularly effective mirror for trucks and similar vehicles.

Accordingly, it is an object of the invention to provide a mirror which substantially reduces glare caused by sunlight or bright lights, e.g. headbeam lights of following vehicles at night, and double or multiple images which distract, at times to a dangerous degree, the driver of a truck.

This object and other objects and advantages of the invention will appear more clearly from the following specification in connection with the accompanying drawings, in which:

FIG. 1 is a perspective view of a mirror in accordance with one embodiment of the invention mounted exteriorly to a truck cab;

FIG. 2 is a section along line II—II of FIG. 1;

FIG. 3 is a view similar to FIG. 2 of a mirror in accordance with a further embodiment of the invention;

FIG. 4 is a perspective view of part of the mirror embodiment according to FIG. 3 showing in particular the components for actuating or moving the mirror; and FIG. 5 is a view similar to FIG. 2 of yet another embodiment of a mirror in accordance with the present invention.

In accordance with the present invention there is provided a housing, a transparent front connected to the housing, and a mirror image-providing surface arranged within the housing, the mirror-image providing surface being locatable at an angle relative to the transparent front to substantially prevent glare and second or third images, the angle being equal to about at least 2.25 or 2.3 times, preferably 3.4 times, though up to 3.9 times the distance in inches of transverse width of said surface.

In accordance with a preferred embodiment of the invention there are provided means for locating said surface at the selected angle and wherein at least one of said surface and said housing is mounted so as to be pivotal about a vertical axis.

In accordance with a preferred embodiment of the image control mirror the transverse width in inches is about six inches and the angle is about 20.5°.

In accordance with another embodiment of the invention the mirror image-providing surface is provided on a member mounted in the housing. This member can be transparent and can be provided with a first surface coating on that side of the member closest to the front or the transparent member can be provided with a second surface coating on that side of the member remote from the front.

In accordance with another embodiment of the invention the mirror image arrangement includes means for illuminating and heating the mirror member. This member can be a planar member or it can be a prism having the transparent front and the mirror image-providing surface.

In accordance with another preferred embodiment, the image control mirror includes means for operatively retaining the member in the housing. Such retaining means can include profiled retaining elements operatively connectible to the housing and seal means operatively connectible between a retaining element and the member belonging therewith.

In accordance with another preferred embodiment of the invention, the means for retaining the mirror member includes a vertical shaft connectible in the housing between a pair of opposed walls, e.g. top and bottom walls, means for securing the member to the shaft so that the mirror image-providing surface is pivotable about the longitudinal axis of the shaft, and means operatively connectible to the member for moving the member, whereby the actuating means extends at least in part exteriorly of the housing.

In accordance with another preferred embodiment, the member is provided with means for heating it. Such a member can also be a prism.

Referring now particularly to the drawings, in FIG. 1 there is shown a frame assembly, comprising, merely by way of example, an upper support arm 11 and two lower support arms 12a, 12b; the frame disassembly is secured to the cabin 10 of a truck or similar vehicle, of which only part is shown, by means of bolts 13 or similar fasteners. The free ends of the support arms 11, 12a, and 12b are aligned so as to coincide at a vertical pivot axis "A" for the mirror assembly which is generally designated by the numeral 14. The mirror assembly 14 is mounted so as to be pivotal about the vertical axis "A", as will be described in further detail below.

The mirror assembly 14, as shown in greater detail in FIG. 2, comprises a generally rectangular housing 15 positioned in vertical attitude between the support arms 11 and 12a, 12b, respectively. The housing 15 is provided with a closed rear wall 16 and side walls 17, with bevelled portions 18 extending between the rear wall 16 and the side walls 17. The forwardly open housing 15 includes rims which are provided, for example, by bending pertaining portions of the walls 17, 19 and 20 into a common plane to provide a retaining frame 23 for a lens 22. Lens 22 is mounted in a U-profiled retaining strip 24, e.g. an extruded member of aluminum, or plastic, or synthetic material. The retaining strip 24 is sealingly connected to housing 15, for example by gluing, so as to be in close contact with the mounting frame 23. The interior of housing 15 is covered by an insulation indicated at 25. At a central location in rear wall 16, there is provided a socket 27 with associated lead ends 28a and 28b leading to a voltage source, not shown, for a small light bulb 29.

A rectangular reflecting mirror member 30 is secured in the interior of housing 15 by means of a U-shaped retaining member 31 with an associated sealing gasket 32, which can also serve as a vibration dampener, being interposed between the mirror member 30 and the retaining member 31. The retaining member 31 can be provided by suitable extruded materials, e.g. aluminum, or a suitable plastic or synthetic material.

The mirror member 30 comprises a base member 34 which, in accordance with one embodiment of the invention, can be a glass member, it being understood that member 34 could be equally provided by another material known in the art, e.g. Lucite, or similar plastic or synthetic material.

According to the embodiment shown in FIG. 2, the base member 34 is coated on the rearward surface with the reflection-providing surface coating 36 of suitable composition and thickness, providing a so-called "second" surface mirror-coating, it being understood that, of course, the base member 34 could be coated with a so-called "first" surface coating of suitable composition and thickness on the forward sides thereof. Such coating compositions are known in the art and need not be described here.

The angle embraced between the lens 22 and the mirror member 30 is 14° for a mirror member having a width of about six inches, the angle being indicated by the double-headed arrow "B". The apex of this angle is as close to the lens 22 as possible, so as to present the mirror member 30 as close to the forward opening of housing 15 as is feasible to provide for convenient viewing therewith. The space between the lens 22 and the mirror member 30 may require hermetic sealing to provide for obstruction-free viewing of the mirror assembly.

The pertaining viewing plane of mirror member 30 of the mirror assembly 14 just described can be adjusted as desired by means of an actuating means, such as a cable system, or the like devices, as are known in the art, not shown. Such actuating means can be attached to housing 15 with suitable pivot members 40, one of which can be seen in FIG. 1, and fasteners, e.g. wing nuts of which one is indicated by numeral 41, being provided therewith. Thus, the mirror assembly 14 can be positioned such that the mirror image-producing member 30 is moved from a normal viewing position, indicated in dash outline through an angle of approximately at least 2.25° or 2.3° and preferably 3.4° per inch of width, or at least 14° and preferably 20.5° in a six inch wide mirror, to the controlled viewing position, as shown in solid lines in FIG. 2. When in such a controlled position, the mirror will effectively eliminate glare and second or third images.

Referring now particularly to the embodiment shown in FIG. 3, the housing 15a, which is generally identical to the housing described with reference to the embodiment shown in FIG. 3, is adapted to receive a pivotally arranged member 50. For this, short pieces of pipe or tubing 51, 51' are secured to the interior surfaces of the top and the bottom walls 19a and 20a (FIG. 4), which in suitable apertures receive the ends of the vertical pivot shaft 52 belonging therewith. The mirror member 50 is secured on brackets 53, 53', whereby either the brackets 53, 53' can rotate about pivot shaft 52, or the brackets 53, 53' are fixed on the shaft which, in turn, is pivotally journalled in the short pieces of pipe or tubing 51, 51'. The mirror member 50 also comprises a surface coating 54, it being understood that coating 54 can be in the form of a "first" surface mirror coating as shown, or a "second" surface mirror coating which would be provided on that surface which is opposite to that on which the "first" surface mirror coating is applied.

While the heat provided by the light bulb 29a may be sufficient to ensure that the mirror member 50 is free of ice or similar other view-obstructing surface coatings, an additional heating means in the form of a foil-type heater, such as heater 54, with leads 54a and 54b, can be provided for defrosting and defogging operations as required.

The mirror image providing surface of the mirror member 50 can be adjusted by actuation of a cable system, generally indicated by the numeral 56, which is attached to mirror member 50 by means of an attachment bracket 57 which, in turn, is attached on one longitudinal side at approximately the central median height (FIG. 4) of the mirror member 50. The cable system 56 is passed through a guide 58 in the bevelled portion 18a of housing 15a with the guide 58 and the associated length of the cable system 56 cooperating to retain the mirror member 50 in the selected position upon actuation by an operator, for example, by means of a bead and corresponding recess arrangement diagrammatically indicated in FIG. 3.

Thus, the mirror member 50, and thereby the mirror image-providing surface can be adjusted from a normal viewing position, indicated in dash lines in FIG. 3, to a controlled viewing position. In the controlled viewing position, the mirror member is set at an angle of approximately 14° to the lens 22a of the assembly, as is shown in solid lines in FIG. 3, when the mirror member 50 has a transverse width of six inches. Such movement can be limited by abutments or stops, not shown. In the controlled position of approximately 3.4° per inch of transverse width, i.e. 20.5° for a six inch wide mirror member 50, glare and "second" or "third" images are effectively prevented.

It will be understood from the foregoing that the mirror assembly according to this embodiment provides the advantage that the mirror assembly is initially mounted in an appropriate attitude by securing the housing 15a in a support bracket system as described with reference to the embodiment shown in FIG. 1. The mirror member 50 can then be moved through the desired angle by actuation of the cable system 56. When use is made of separate mirror assemblies on both sides of the cabin, the actuating cable system 56 of each one of the mirror assemblies can be actuated simultaneously by combining the free cable ends.

Still another embodiment of the invention is shown in FIG. 5. This embodiment shows the housing 15b which is generally identical to the housing described in the foregoing, with a lamp assembly being provided and means for pivoting the housing to the desired attitude. Instead of a generally flat mirror member, this embodiment comprises a triangular, in cross section, mirror member 60 having an inclined light reflecting surface 62, inclined at an angle of 20.5° from the plane of the forward face of housing 15b, at a width of the straight surface 63 thereof six inches. The mirror member 60 is seated in retaining strips indicated by numerals 65 and 66, e.g. strips of an extruded material such as aluminum, plastic, or synthetic material, to be securely retained in the housing 15b, it being understood that gluing may be employed and suitable seals and insulation material, as required. The inclined rearward surface 62 is coated with a suitable mirror coating generally designated by the numeral 64.

The mirror assembly according to FIG. 5 may be moved from a normal viewing position which is indicated in dash outline in FIG. 5 to a controlled viewing position indicated in solid lines in FIG. 5 in a manner analogous to that described with reference to the embodiments of FIGS. 1 and 2. Also, if desired, the prism proper may be arranged so as to be movable in a manner analogous to that described with reference to the embodiment illustrated in FIGS. 3 and 4.

The invention makes use of the observation that the efficiency of outside truck rearview mirrors can be enhanced substantially when the angle of the mirror is inclined to be at an angle of about 3.4° per each inch of transverse viewing width, so as to substantially reduce glare and second or third images. The elimination or substantial reduction, while maintaining a generally true mirror image of a rearward traffic situation has heretofore not been achieved by the mirror assemblies of the prior art.

It will be understood that while the present invention has generally been described in context with a remotely controllable mirror, it will, of course, be possible to employ the invention in a manually adjustable manner, as is known in the art.

It should also be understood that the features of the present invention are applicable for the sun during the daytime or for bright lights at night with respect to the brightness of the reflections from the heavy duty, side mirrors as provided for trucks or similar commercial vehicles. The angle to substantially prevent glare and second or third images is set forth as being within a range equal to about 2.25 or 2.3 to 3.9 times the distance in inches of transverse width of the surface. The preferred value has been found to be about 3.4° times the distance in inches of transverse width of the mirror in images-providing surface. The lower value of the range at about 2.3 times the distance in inches of the transverse width of the surface may result in a more clear and better image since the less the light rays are, the better the image which is found to be the value of 2.3 times the distance in inches of transverse width of the surface and workable with less ghosts or ghost images when the angle is smaller. However, the object is to eliminate double images if possible and for this reason the angles range broadly from 2.25 times the distance in inches of transverse width of the surface to 3.9 times the distance in inches of transverse width of the surface. The preferred value is 3.4° times the distance in inches or 20.5° in a six inch wide mirror. This six inch wide mirror is mentioned because regulation requires a mirror having a size of 6 inches by 16 inches for heavy duty, trucks or similar commercial vehicles. The value of 3.4° times the distance in inches of transverse width of the surface represents the optimum value whereas the value of 2.3 times the distance in inches of transverse width of the surface can be taken as still within the range that is workable for achieving the result or object of the present invention. The features of the present invention should be considered as including safety equipment; the regulation of glare of the sun during the day as well as the glare of bright lights at night resulting in brightness upon the eyes of the truck driver or operator of a commercial vehicle must be considered a safety factor for avoidance of traffic accidents. Also there is to be understood that the mirror structure of FIGS. 2 and 5 illustrated in the drawings can be equipped with the internally rotatable mirror configuration of FIG. 3 especially since a mirror having a size of six inches by sixteen inches encounters considerable wind resistance against any turning of the mirror during travel and use at higher speeds including 55 mph or more under certain circumstances. The provision of having the mirror rotatable internally as in FIG. 3 is advantageous in view of avoidance of such wind resistance during changes attempted to be made when traveling along at highway speeds; the rotatable mirror when rotatable within the housing itself, facilitates adjustment for safety purposes in accordance with the present invention. The mirror generally is externally mounted to be pivotable or rotatable about a vertical axis to one side of the vehicle body or door of the truck or commercial vehicle.

Thus, the invention is in no way restricted to the specific disclosure of the specification and drawings, but also encompasses any modifications within the scope of the appended claims.

What I claim is:

1. An image control mirror for exterior mounting on trucks, tandem trailers, commercial vehicles and the like, said mirror comprising in combination:

an exterior housing;

a transparent front lens connected to said housing;

a mirror image-providing surface arranged within said housing, said mirror image-providing surface being pivoted on only one side with the other side being locatable selectively in either of a normal position as close to as well as parallel to said lens and an anti-glare position differing at an angle distinctly specific as to said transparent front lens to substantially prevent both day and night glare and also simultaneously automatically refractively avoiding second or third multiple images which distract from proper undistorted image maintained therewith, said distinctly specific angle being within a range equal to about 2.25 to 3.9 times the distance in inches at a value determined multiply per inch of transverse width of said surface;

gasket means mounted in said housing both for hermetic sealing of space between said lens and said mirror surface and also to serve as a vibration dampener therewith, means for locating said surface at the selected angle and at least one of said surface and said housing being mounted externally so as to be pivotal only about a vertical axis, the transverse width being approximately six inches, and the angle being approximately in a range between 14° and 20.5°, said mirror image-providing surface being provided on a member mounted in said housing, said member being transparent, and said surface being provided by a second surface coating on that side of said member remote from said front, and further including means for safety illuminating and electrically heating said member, said member being a prism providing both said transparent front lens and said mirror image-providing surface, and further including means for operatively retaining said member in said housing including a profiled retaining element operatively connectible to said housing, and seal means operatively connectible between said retaining element and said member, said means for retaining said member including:

a vertical shaft operatively connectible in said housing between a pair of opposed walls thereof;

means for securing said member to said shaft so that said mirror image-providing surface is pivotal about the longitudinal axis of said shaft; and means operatively connectible to said member for moving said member, said means extending at least in part exteriorly of said housing for actuation thereof, foil-type means for electrically heating said member, said member being a prism, said angle being equal to about 3.4 times the distance in inches of transverse width of said surface.

2. A two position rearview mirror for use externally with a road vehicle such as a truck or trailered vehicle in which the rear view from the driving position of the vehicle is likely to be obstructed, said mirror having only two operative positions, those positions being a normal position and a single anti-glare position, said mirror comprising in combination:

a clear uncoated, transparent lens surface having a selected width;

a clear reflecting surface not coated with a light-absorbing substance spaced only on one side from the transparent surface by pivot relationship therebetween on only one side thereof;

means for mounting said surfaces on the exterior of the vehicle in front of the driving position wherein a driver positioned behind the mirror can view images reflected from the reflecting surface when the mirror is in the normal position, said mounting means including means for hermetic sealing of space between transparent-reflecting surfaces and also to serve as a vibration dampener and including means thereon defining a vertical axis and means for attaching at least the reflecting surface to the mounting means in alignment with the vertical axis for pivotal movement about the vertical axis that permits pivotal movement at a distinctly specific angle between the normal position as close to as well as parallel to the lens surface in which normal position the reflected image is observed by the driver and the anti-glare position in which only a refracted image is seen by the driver, the distinctly specific angle in degrees between the normal position and anti-glare position being only in the range of 2.25 to 3.9 times the distance in inches of the width of the reflected surface in order simultaneously to eliminate multiple images automatically refractively when the mirror is in the anti-glare position, width of the reflecting surface being approximately six inches and the angle between the normal and anti-glare position being approximately twenty degrees, the reflecting surface and lens surface being movable relative to one another between the normal position and anti-glare position.

3. A two-position, rearview mirror for use externally with a road vehicle such as a truck or trailered vehicle in which the rear view from the driving position of the vehicle is likely to be obstructed, said mirror having only two operative positions, those positions being a normal position and a single anti-glare position, said mirror comprising in combination:

a housing having a rearwardly facing opening;

means for fixing the housing to the exterior of the vehicle wherein when the mirror is operative the housing is fixed with respect to the vehicle;

a clear, uncoated transparent lens fixed over the rearwardly facing opening;

means within the housing for defining a vertical axis behind the lens;

an uncoated mirror having a light-reflecting surface with no light absorbing properties;

means both for hermetic sealing of space between the lens and mirror surface as well as also to serve as a vibration dampener therewith;

means for mounting the mirror for pivotal rotation on one side only about the vertical axis that permits vertical movement at a distinctly specific angle between the normal position in which a reflected image is observed by the driver and the anti-glare position in which a refracted image is observed by the driver, the distinctly specific angle in degrees through which the uncoated mirror rotates with respect to the lens between the normal position as close to as well as parallel to said lens and the anti-glare position being only in the range of 2.25 to 3.9 times the width of the lens in inches in order simultaneously to eliminate multiple images automatically refractively when the mirror is in the anti-glare position, the angle between the normal and anti-glare positions being about twenty degrees and the width of the lens being about six inches, further including means for heating the mirror to dissipate moisture, and also further including a light within the housing for indicating the presence of the mirror.

* * * * *